United States Patent
Collart et al.

(10) Patent No.: US 10,239,636 B2
(45) Date of Patent: Mar. 26, 2019

(54) METHOD FOR MANUFACTURING A PANEL MADE OF COMPOSITE MATERIAL INCORPORATING A LIGHTNING PROTECTION MEANS, AND PANEL MADE OF COMPOSITE MATERIAL MANUFACTURED BY WAY OF SAID METHOD

(71) Applicant: Airbus Operations (SAS), Toulouse (FR)

(72) Inventors: Cyrille Collart, Nantes (FR); Richard Murillo, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 213 days.

(21) Appl. No.: 14/936,090

(22) Filed: Nov. 9, 2015

(65) Prior Publication Data
US 2016/0130014 A1 May 12, 2016

(30) Foreign Application Priority Data
Nov. 10, 2014 (FR) .................................. 14 60864

(51) Int. Cl.
*B64D 45/02* (2006.01)
*B29C 70/38* (2006.01)
*B29C 70/30* (2006.01)
*B32B 37/14* (2006.01)
*B64C 1/12* (2006.01)
(Continued)

(52) U.S. Cl.
CPC .............. *B64D 45/02* (2013.01); *B29C 70/30* (2013.01); *B29C 70/382* (2013.01); *B29C 70/386* (2013.01); *B32B 37/14* (2013.01); *B64C 1/12* (2013.01); *B29C 70/88* (2013.01);
(Continued)

(58) Field of Classification Search
CPC ...... B64D 45/02; B29C 70/382; B29C 70/386; B29C 70/38; B29C 70/885; B32B 37/14; B64C 1/12
See application file for complete search history.

(56) References Cited

U.S. PATENT DOCUMENTS 5,759,462 A 6/1998 Jordan
5,763,069 A 6/1998 Jordan
(Continued)

FOREIGN PATENT DOCUMENTS

EP 0734318 10/1996
WO 2014011293 1/2014

OTHER PUBLICATIONS

French Search Report, dated Oct. 1, 2015.

*Primary Examiner* — John L Goff, II
(74) *Attorney, Agent, or Firm* — Greer, Burns & Crain, Ltd.

(57) ABSTRACT

A method for manufacturing a panel made of composite material incorporating a lightning protection arrangement which comprises strips with a conductive layer. The method comprises a step of laying the strips in an automated manner, the strips having a width of less than 20 mm and being distributed in a first set of mutually parallel strips that are laid in a first laying direction and a second set of mutually parallel strips that are laid in a second laying direction that intersects the first laying direction. A panel made of composite material manufactured by way of this method is also disclosed.

3 Claims, 2 Drawing Sheets

(51) Int. Cl.
    *B29C 70/88*     (2006.01)
    *B64C 1/00*      (2006.01)
(52) U.S. Cl.
    CPC .......... *B29C 70/882* (2013.01); *B29C 70/885* (2013.01); *B64C 2001/0072* (2013.01); *Y02T 50/433* (2013.01)

(56) References Cited

U.S. PATENT DOCUMENTS

| 2012/0063050 A1 | 3/2012 | Langone et al. |
| 2012/0171477 A1 | 7/2012 | Sang et al. |
| 2013/0118770 A1* | 5/2013 | De Jong ................ H02G 13/00 174/2 |

* cited by examiner

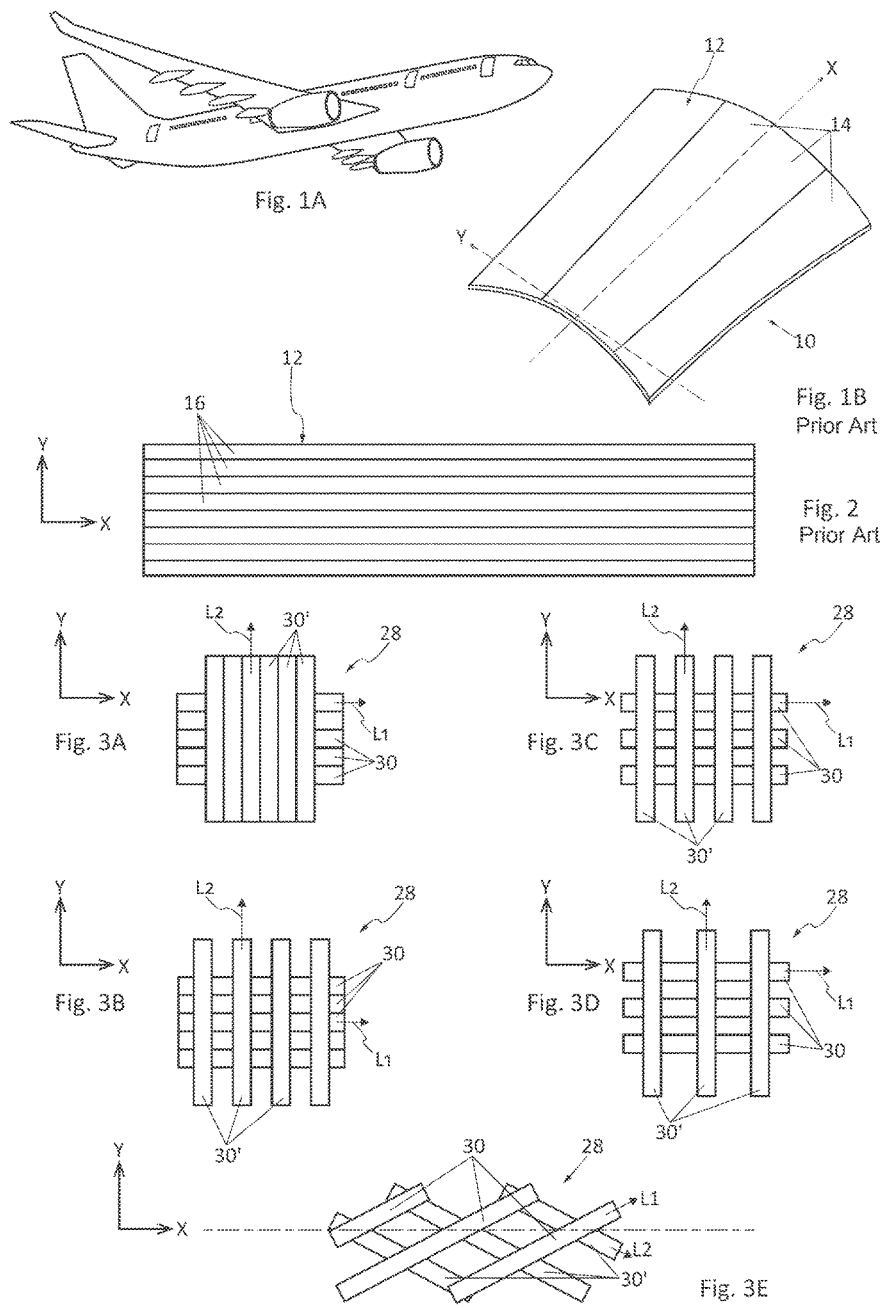

METHOD FOR MANUFACTURING A PANEL MADE OF COMPOSITE MATERIAL INCORPORATING A LIGHTNING PROTECTION MEANS, AND PANEL MADE OF COMPOSITE MATERIAL MANUFACTURED BY WAY OF SAID METHOD

CROSS-REFERENCES TO RELATED APPLICATIONS

This application claims the benefit of the French patent application No. 1460864 filed on Nov. 10, 2014, the entire disclosures of which are incorporated herein by way of reference.

BACKGROUND OF THE INVENTION

The invention relates to a method for manufacturing a panel made of composite material incorporating a lightning protection means and also to a panel made of composite material manufactured by way of the method.

As is known, the fuselage of an aircraft comprises a juxtaposition of metal sheets or panels. In the event of a lightning strike, this metal fuselage forms, in the manner of a Faraday cage, a means of protection for the elements disposed inside (in particular the electrical systems which are connected to the fuselage of the aircraft) and allows the electric current to flow from the front tip to the rear tip of the fuselage.

In order to reduce the mass of the aircraft, the fuselage panels are made of composite material, in particular composite material reinforced with carbon fibers of the CFRP or CRP type (for carbon fiber reinforced polymer or carbon fiber reinforced plastic).

These panels made of composite material are obtained by laying on a mold plies of carbon fibers generally preimpregnated on a support. Once all of the plies have been laid, the panel is then subjected to a consolidation or polymerization step.

In addition to saving mass, this type of composite material has good mechanical properties, an absence of corrosion and good fatigue behavior.

However, in contrast to metal panels made of aluminum alloy, these panels made of composite material have low electrical conductivity.

Consequently, it is necessary to add to these panels made of composite material a lightning protection means known as LSP (for lightning strike protection).

This lightning protection means is generally fitted prior to the consolidation or polymerization, either directly on the mold prior to the laying of the plies of fibers, or after the laying of the plies of fibers.

As illustrated in FIG. 1B, a fuselage panel 10 comprises a first radius of curvature in a first direction X and a second radius of curvature in a second direction Y.

In the rest of the description, the direction X corresponds to the longitudinal direction of the aircraft (which runs from front to rear) and the direction Y corresponds to a transverse direction, perpendicular to the longitudinal direction X.

This panel 10 made of composite material comprises a lightning protection means 12.

According to one embodiment, a lightning protection means comprises a conductive layer (a mesh, a conductive epoxy coating or a metal foil), a support layer and a resin film.

According to one procedure, the plies of carbon fibers are laid in position at a first station. Next, the lightning protection means is fitted at a second station by manually juxtaposing lightning protection strips 14. These strips are disposed in one direction and have edges which overlap in order to ensure electrical continuity.

The strips 14 are cut from rolls and have a width which can reach 900 mm.

This procedure makes it possible to control the placing of the strips on a surface comprising a radius of curvature, or two radii of curvature, such as an aircraft fuselage panel.

In order to increase productivity, one solution consists in automating the laying of the lightning protection strips.

A first solution consists in using an automatic draping machine of the ATL type (for automated tape laying). This type of machine makes it possible to lay strips with a width of between 150 and 300 mm. This type of machine makes it possible to ensure that the edges of the strips overlap in order to ensure electrical continuity. However, it can only be used to lay strips on a flat support, this not being the case in a fuselage panel. Even if it were conceivable to lay the plies of fibers and the lightning protection strips flat and then to deform the assembly in order to obtain a curved panel, the electrical continuity between the strips could no longer be ensured after deformation.

A second solution consists in using a fiber placement machine of the AFP type (for automated fiber placement). This type of machine makes it possible to lay strips on curved surfaces such as a fuselage panel. However, this type of machine only makes it possible to lay strips with a width that does not exceed 2 inches, or around 5 cm.

As illustrated in FIG. 2, the lightning protection means comprises strips 16 laid on the fuselage panel 10 which are mutually parallel and arranged in the direction X. These strips 16 have a width that does not exceed 2 inches in order to be able to be placed on a curved surface in an automated manner. In this case, it is found that the electrical conductivity in the direction X is different from the electrical conductivity in the direction Y (with a ratio of 10 when the conductivity is expressed in mOhm per unit area). The size of the difference between these two values reduces the efficiency of the lightning protection means. In addition, it does not ensure the protection of the electrical systems present in an aircraft of which the fuselage is produced in this way.

SUMMARY OF THE INVENTION

The present invention aims to remedy the drawbacks of the prior art by proposing a solution which makes it possible to lay lightning protection strips in an automated manner while having sufficient electrical conductivity in all directions of the plane of the panel to conduct the electricity generated during a lightning strike.

To this end, a subject of the invention is a method for manufacturing a panel made of composite material incorporating a lightning protection means which comprises strips with a conductive layer. The method is characterized in that it comprises a step of laying the strips in an automated manner, the strips having a width of less than 20 mm and being distributed in a first set of mutually parallel strips that are laid in a first laying direction and a second set of mutually parallel strips that are laid in a second laying direction that intersects the first laying direction.

This method makes it possible to lay the strips in an automated manner, by using for example a fiber placement machine of the AFP type, on a surface comprising at least one radius of curvature, while having electrical conductivity in all directions in accordance with aeronautical regulations.

Preferably, the first laying direction and the second laying direction define patterns in the form of a parallelogram.

In some configurations, for at least one of the two sets of strips, the strips are disposed edge-to-edge.

In other configurations, the strips of the two sets of strips are spaced apart.

According to one preferred embodiment, the strips of the first set are spaced apart by a distance equal to their width and the strips of the second set are spaced apart by a distance equal to four times their width. This solution makes it possible to obtain an excellent compromise between the electrical conductivity and the mass of the lightning protection means.

According to one variant, the first laying direction and the second laying direction are perpendicular and one of the laying directions is parallel to a longitudinal direction of the aircraft.

According to another variant, the first laying direction and the second laying direction define patterns in the form of a rhombus, one diagonal of which is parallel to a longitudinal direction of the aircraft.

Preferably, the method for manufacturing a fuselage panel of an aircraft comprises a first step of laying fibers on a convex laying surface of a tool and a second step of laying lightning protection strips on the final layer of fibers on the same tool.

A further subject of the invention is a panel made of composite material incorporating a lightning protection means which comprises strips with a conductive layer. This panel is characterized in that the strips have a width of less than 20 mm and are distributed in a first set of mutually parallel strips that are laid in a first laying direction and a second set of mutually parallel strips that are laid in a second laying direction that intersects the first laying direction.

Preferably, the first laying direction and the second laying direction define patterns in the form of a parallelogram.

In some configurations, for at least one of the two sets of strips, the strips are disposed edge-to-edge.

In other configurations, the strips of the two sets of strips are spaced apart.

According to one preferred embodiment, the strips of the first set are spaced apart by a distance equal to their width and the strips of the second set are spaced apart by a distance equal to four times their width.

According to one variant, the first laying direction and the second laying direction are perpendicular and one of the laying directions is parallel to a longitudinal direction of the aircraft.

According to another variant, the first laying direction and the second laying direction define patterns in the form of a rhombus, one diagonal of which is parallel to a longitudinal direction of the aircraft.

BRIEF DESCRIPTION OF THE DRAWINGS

Further features and advantages will become apparent from the following description of the invention, the description being given only by way of example, with reference to the appended drawings, in which:

FIG. 1A is a perspective view of an aircraft,

FIG. 1B is a perspective view of an aircraft fuselage panel,

FIG. 2 is a top view of a part of a fuselage panel covered with lightning protection strips in a prior art configuration, FIGS. 3A to 3E are top views of parts of fuselage panels covered with lightning protection strips in various configurations which illustrate the invention.

DETAILED DESCRIPTION OF THE PREFERRED EMBODIMENTS

Figures 6, 7:
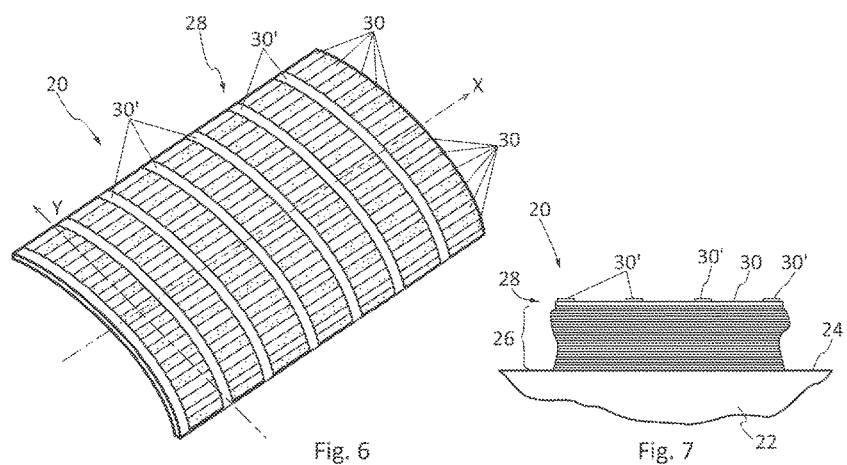
FIG. 6 is a perspective view of an aircraft fuselage panel covered with a lightning protection means in the configuration illustrated in FIG. 5.
FIG. 7 is a section through the panel in FIG. 6.

As illustrated in FIGS. 6 and 7, a panel 20 made of composite material comprises fibers embedded in a resin matrix.

Depending on the circumstances, the resin is a thermosetting or thermoplastic resin. The fibers may be made of glass, carbon or the like.

According to one embodiment, the panel 20 made of composite material is of the CFRP type (for carbon fiber reinforced polymer) and comprises carbon fibers.

According to one procedure, the plies of fibers preimpregnated with resin are laid on a flat support so as to obtain a fiber preform. Next, this preform is deformed on a tool which comprises a surface having a geometry identical to that of the panel to be obtained.

According to another procedure, a fiber placement machine of the AFP type is used to lay strands of fibers on a tool 22 (visible in FIG. 7) which comprises a laying surface 24 with a geometry identical to that of the panel 20 to be obtained.

A strand of fibers comprises at least one fiber. Generally, it comprises a plurality of fibers arranged in the form of a narrow strip with a width of less than 20 mm. In one configuration, a strand has a width of 3.2 mm, 6.32 mm or 12.7 mm.

Of course, the invention is not limited to these two procedures for laying the fibers. Preferably, the fibers are grouped in layers which are superposed on one another so as to obtain a fiber preform 26, a layer comprising one ply or juxtaposed plies or juxtaposed strands.

The panel 20 made of composite material comprises a lightning protection means 28.

According to variants, the lightning protection means 28 is attached to the final layer of fibers, directly to the laying surface before the layers of fibers are laid in position, or interposed between two layers of fibers.

According to a preferred embodiment, the fibers are laid on a convex laying surface which corresponds to the inner surface of the fuselage panel (oriented towards the inside of the aircraft) and the lightning protection means 28 is fitted on the final layer of fibers. Thus, the lightning protection means 28 is placed on the outer surface of the fuselage.

According to another embodiment, the lightning protection means 28 is fitted before the first layer of fibers is laid in position, in order to be positioned on the internal surface of the fuselage.

The lightning protection means 28 comprises at least one conductive layer, for example a metal mesh, a split or non-split metal sheet, or an expanded-metal sheet.

According to one embodiment, the lightning protection means 28 comprises a conductive layer, a support layer and a resin film. These elements are not described in more detail since they are identical to those in prior art lightning protection means.

The lightning protection means comprises a plurality of strips 30, 30'. Each strip comprises two parallel edges that are spaced apart by a distance which corresponds to the width of the strip.

According to the invention, each strip has a width of less than 20 mm. Preferably, the strips 30, 30' have a width of around 3.2 mm, 6.32 mm or 12.7 mm.

This width makes it possible to lay the strips in an automated manner, using a fiber placement machine of the AFP type, on a surface comprising at least one radius of curvature, or two radii of curvature, such as a fuselage panel or a wing panel of an aircraft.

Each strip 30, 30' comprises at least one conductive layer. Preferably, it comprises the same superposition of layers and films as the lightning protection means.

According to one feature of the invention, illustrated in FIGS. 3A to 3E, the lightning protection means 28 comprises a first set of mutually parallel strips 30 that are laid in a first laying direction L1 and a second set of mutually parallel strips 30' that are laid in a second laying direction L2 that intersects (and is thus not parallel to) the first laying direction L1.

The first laying direction L1 is parallel to the edges of the strips 30 of the first set.

The second laying direction L2 is parallel to the edges of the strips 30' of the second set.

This configuration makes it possible to obtain electrical conductivity lower than the threshold set by aeronautical regulations in all the directions of the panel.

According to one variant that is illustrated in FIGS. 3A to 3D, the first laying direction L1 and the second laying direction L2 are perpendicular.

Advantageously, the first laying direction L1 is parallel to the longitudinal direction X of the aircraft and the second laying direction L2 is parallel to the transverse direction Y.

In the case of a fuselage panel of an airplane, the first laying direction L1 of the strips 30 of the first set is parallel to the first radius of curvature of the panel and the second laying direction L2 of the strips 30' of the second set is parallel to the second radius of curvature of the panel. This arrangement simplifies the fitting of the strips.

According to a first configuration, illustrated in FIG. 3A, the strips 30 of the first set are disposed edge-to-edge and are not spaced apart and the strips 30' of the second set are disposed edge-to-edge and are not spaced apart.

According to a second configuration, illustrated in FIG. 3B, the strips 30 of the first set are disposed edge-to-edge and are not spaced apart and the strips 30' of the second set are spaced apart and are not disposed edge-to-edge. According to this second configuration, the strips 30' of the second set are spaced apart by a distance equal to their width.

According to a third configuration, illustrated in FIG. 3C, the strips 30 of the first set and the strips 30' of the second set are spaced apart and are not disposed edge-to-edge. According to this third configuration, the strips 30 of the first set and the strips 30' of the second set are spaced apart by a distance equal to their width.

According to a fourth configuration, illustrated in FIG. 3D, the strips 30 of the first set and the strips 30' of the second set are spaced apart and are not disposed edge-to-edge. According to this fourth configuration, the strips 30 of the first set are spaced apart by a distance equal to their width and the strips 30' of the second set are spaced apart by a distance equal to twice their width.

FIGS. 4A to 4D show a surface protected by the lightning protection means in each of the above-described configurations.

For the first and second configurations, it can be seen that the entire surface of the panel is protected.

For the third configuration, unprotected zones 32 which have a diameter of around 3 to 4 mm for the largest zones can be seen. For the fourth configuration, unprotected zones 34 which have a diameter of around 10 mm for the largest zones can be seen. Thus, the zone at risk of being damaged by a lightning strike on such a panel has a surface area of less than 4000 mm2.

The strips 30 and 30' of the two sets have a small thickness, less than 0.3 mm, preferably around 0.1 mm.

Thus, when the strips 30 and/or 30' of at least one set are spaced apart, the surface defects are acceptable for finishing the panels of the fuselage and the application of paint.

Figures 4A, 4B, 4C, 4D:
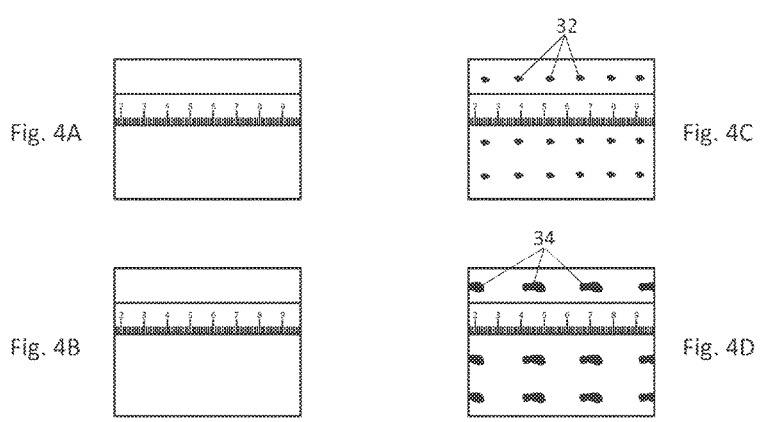
FIGS. 4A to 4D are photographs illustrating the surfaces of each of the panel parts illustrated in FIGS. 3A to 3D after a lightning strike.
Figure 5:
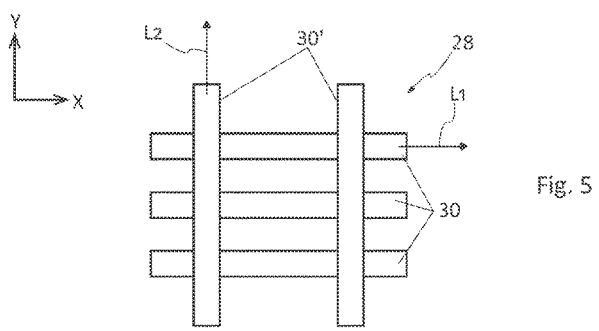
FIG. 5 is a top view of a fuselage panel part covered with lightning protection strips, which illustrates a preferred configuration of the invention.

According to a preferred configuration, illustrated in FIG. 5, the strips 30 of the first set and the strips 30' of the second set are spaced apart and are not disposed edge-to-edge. According to this preferred configuration, the strips 30 of the first set are spaced apart by a distance equal to their width and the strips 30' of the second set are spaced apart by a distance equal to four times their width. Preferably, the strips 30 of the first set are laid in a first laying direction parallel to the longitudinal direction X of the aircraft and the strips 30' of the second set are laid in a second laying direction parallel to the transverse direction Y (or perpendicular to the first laying direction). By way of example, each strip 30, 30' has a thickness of 18 μm and is impregnated with a resin having a thickness of 45 μm.

This configuration makes it possible to find the best compromise between the electrical conductivity and the mass of the lightning protection means.

Thus, according to this preferred configuration, electrical conductivity of 2 mOhm per unit area in the longitudinal direction X and 5 mOhm per unit area in the direction Y (instead of 1 and 4 mOhm per unit area, respectively, in the case of a wide strip laid manually according to the prior art) and a mass of 160 g/m2 (instead of 273 g/m2 in the case of a wide strip laid manually according to the prior art) are obtained.

According to another variant, illustrated in FIG. 3E, the strips 30 of the first set are oriented in a direction L1 and the strips 30' of the second set are oriented in a direction L2 so as to define patterns in the form of a rhombus. Preferably, one diagonal of the rhombuses is parallel to the longitudinal direction X of the aircraft.

Preferably, the strips 30 of the first set are oriented in a direction L1 and the strips 30' of the second set are oriented in a direction L2 so as to define patterns in the form of a parallelogram. Like the configurations illustrated in FIGS. 3A, 3B, 3C, 3D and 5, for the rhombus configurations, the strips of each set can be disposed edge-to-edge or in a more or less spaced-apart manner.

According to one procedure, the strips 30, 30' of the two sets are laid in position using a fiber placement machine of the AFP type.

The strips 30, 30' are unwound from a reel situated on a support shaft and are conveyed to a laying head of the fiber placement machine.

Advantageously, the strands of fibers and the strips are laid in position on the same tool with the same fiber placement machine. This solution makes it possible to rationalize the method for manufacturing the panel. Thus, it is no longer necessary to move the fiber preform from a first tool to a second tool provided for fitting the lightning protection means.

Moreover, on account of the small difference between the electrical conductivity values in each of the directions of the plane of the panel, in the various laying configurations of the plies of fibers of the method according to the invention, the lightning protection means is more efficient.

Once the fibers have been laid in position and the lightning protection means fitted, the assembly is consolidated or polymerized so as to obtain a panel made of composite material which incorporates a lightning protection means.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a fuselage panel of an aircraft made of composite material incorporating a lightning protection means which comprises strips with a conductive layer, comprising the steps:

laying the strips in an automated manner, the strips having a width of less than 20 mm, said laying comprising laying a first set of mutually parallel strips each having a conductive layer in a first laying direction parallel to a longitudinal direction of the aircraft and laying a second set of mutually parallel strips each having a conductive layer in a second laying direction parallel to a transverse direction of the aircraft and perpendicular to the first laying direction, wherein the strips of the two sets of strips are spaced apart, wherein the strips of the first set are spaced apart by a distance equal to their width and the strips of the second set are spaced apart by a distance equal to four times their width to obtain the best compromise between an electrical conductivity and a mass of the lightning protection means.

2. A method for manufacturing a fuselage panel of an aircraft made of composite material according to claim 1, wherein each strip has a thickness of 18 μm and is impregnated with a resin having a thickness of 45 μm.

3. The method according to claim 1, wherein the panel is a fuselage panel of an aircraft, further comprising a first step of laying fibers on a convex laying surface of a tool and a second step of laying lightning protection strips on a final layer of fibers on the same tool.

* * * * *